Patented Oct. 17, 1939

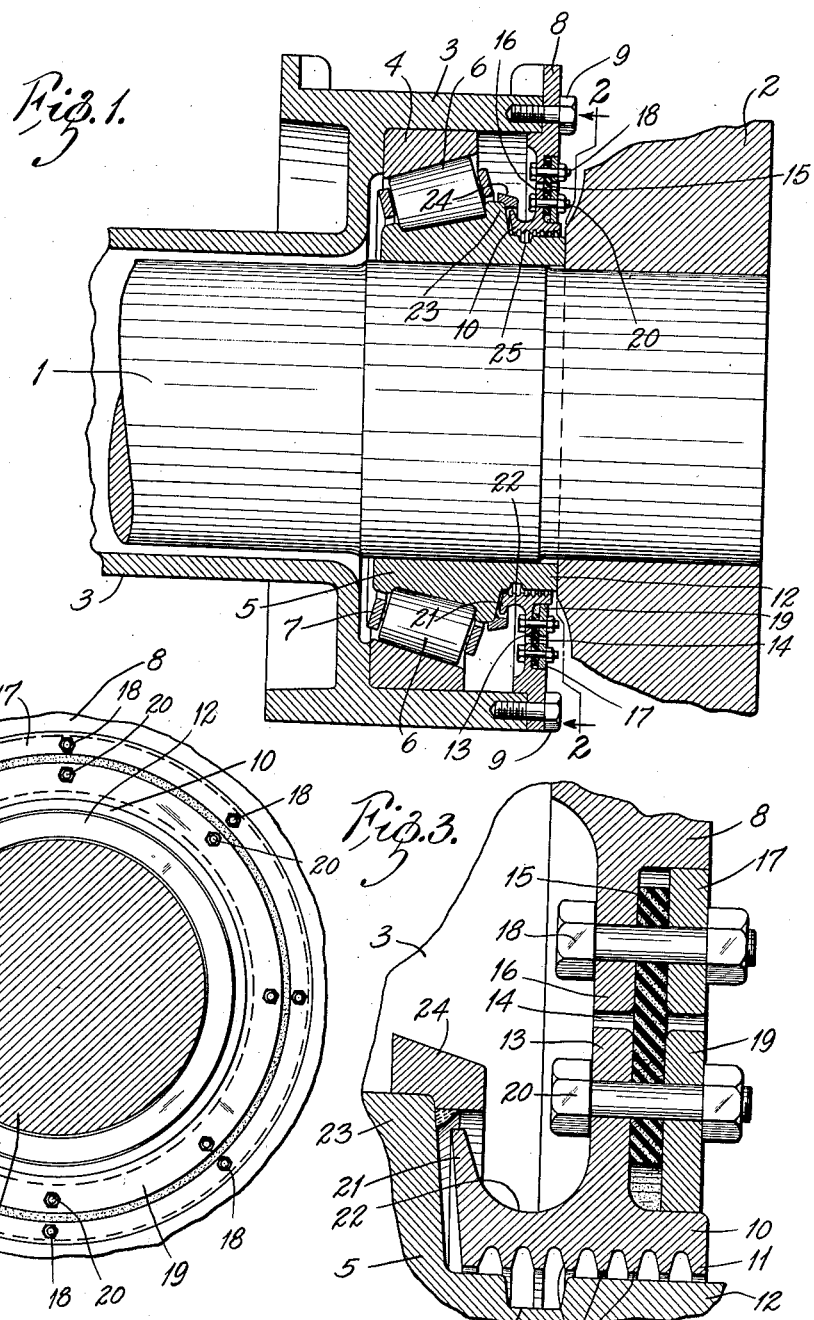

2,176,294

UNITED STATES PATENT OFFICE 2,176,294

END CLOSURE FOR AXLE HOUSINGS

William P. Cox, Canton, Ohio, assignor to The Timken Roller Bearing Company, Canton, Ohio, a corporation of Ohio Application March 26, 1938, Serial No. 198,204

3 Claims. (Cl. 308—187.1)

My invention relates to axle constructions of the type wherein the axle projects beyond the end of a housing and a roller bearing is interposed between the axle and the housing. The principal object of the invention is to devise means which will prevent the escape of lubricant and will remain operative even when the axle shifts somewhat from its correct position in relation to the housing. The invention consists in the parts and combinations of parts hereinafter described and claimed.

In the accompanying drawing which forms part of this specification and wherein like numerals refer to like parts wherever they occur, Fig. 1 is a longitudinal sectional view of a portion of an axle construction embodying my invention;

Fig. 2 is a cross-section thereof on the line 2—2 of Fig. 1; and

Fig. 3 is an enlarged longitudinal section mainly of the inner portion of the end closure.

The axle construction shown in Fig. 1 is of the locomotive driving axle type. It comprises an axle 1 having a driving wheel 2 secured on its end, a hollow housing 3 and a taper roller bearing interposed between the axle and the housing. This bearing comprises a cup or outer raceway member 4 seated in the enlarged end of the housing, a cone or inner raceway member 5 secured on the axle, a series of taper rollers 6 interposed between the two raceway members and a cage 7 for spacing said rollers apart. The outer end of the cone bears against the hub of the wheel.

At its end, the housing has a closure 8 which is secured by cap screws 9. This closure has a large opening therethrough. In this opening, but spaced from the wall thereof, is a sealing member 10 in the form of a perforated hub with annular ribs 11 in the bore thereof, which ribs fit freely around an extension 12 of the inner raceway member of the bearing or have slight clearance therefrom. This hub or sealing member has a wide circumferential rib 13 extending outwardly from the body thereof in substantial alinement with the inner marginal portion of the main closure 8, that is, with the portion of the closure adjacent to the opening therein.

An annular space 14 is left between said inner margin of the main closure and the outer margin of the rib of the hub member. A wide flat ring 15 of elastic material, such as synthetic rubber, is placed opposite the annular space 14 with its margins overlapping and bearing flatwise against both the inner marginal portion 16 of the main closure and the circumferential rib 13 of the hub member. This elastic ring 15 is held in place by means of one clamping ring 17 secured to the closure by bolts 18 and a second clamping ring 19 secured to the rib 13 by bolts 20. The adjacent margins of said clamping rings 17 and 19 are spaced apart. The outer clamping ring 17 fits in an annular recess provided therefor in the outer face of the main member; and the inner clamping ring 19 fits on the outer surface of the hub member.

The inner end of the hub or sealing member has an outwardly extending flange 21 which is spaced from the main circumferential rib and forms therewith an oil groove 22. On the thrust rib portion 23 of the inner raceway member 5 of the bearing is mounted a ring 24 that tapers toward the closure and extends far enough to overlap said oil groove. Another oil groove 25 is formed in the outer surface of the extension 12 of the inner raceway member opposite the inner end portion of the hub member.

The operation of the invention is as follows: So long as the bearing is correctly adjusted and the axle is in its correct position, the entire load of the housing is transmitted to the axle through the bearing, and the hub or sealing member is either slightly clear of the axle or makes only light contact therewith. If the bearing becomes loose, the housing drops and thereby brings the hub member into contact with the top of the extension of the inner raceway member on the axle; but, on account of the yielding character of the elastic ring 15, such ring cannot transmit any considerable portion of the housing load to the axle. Under load, the elastic ring is compressed until the space between the inner margin 16 of the main closure and the outer margin of the rib 13 of the hub member is completely taken up. Thus it is possible for the axle and housing to shift considerably from their correct relative positions without causing the hub member to score the extension of the inner raceway member or to impose abnormal stress on the main closure.

While I have described a locomotive axle construction, it is obvious that the invention is applicable to other constructions wherein a shaft or axle projects through a housing, whether the housing sustains the shaft or vice versa. Likewise, instead of having the hub member fit around an extension of the inner raceway member, it may fit directly around the axle itself or other member thereon. As the clamping rings are detachably secured, the elastic ring itself may be replaced whenever the occasion may require, provided the wheel 2 is first removed or the assembly is otherwise adapted to make such elastic ring accessible.

What I claim is:

1. The combination of a housing having an end closure, an axle extending through said end closure, and a taper roller bearing between said housing and said axle and serving to transmit the load of the housing to the axle, said end closure comprising a main member with an opening therethrough, a hub member positioned in said opening clear of the main member and freely fitting the axle, and a relatively short and wide ring of elastic material which radially overlaps and is secured flatwise to the adjacent marginal portions of said main and hub members.

2. The combination of a housing having an end closure, an axle extending through said end closure, and a taper roller bearing between said housing and said axle and serving to transmit the load of the housing to the axle, said end closure comprising a main member with an opening therethrough, a hub member positioned in said opening clear of the main member and freely fitting the axle, and a relatively short and wide ring of elastic material which radially overlaps and is detachably secured flatwise to the adjacent marginal portions of said main and hub members.

3. The combination of a housing having an end closure, an axle extending through said end closure, and a bearing between said housing and said axle and serving to transmit the load of the housing to the axle, said end closure comprising a main member with an opening therethrough and a counterbore around said opening, a hub member freely fitting the axle and having a circumferential flange in substantially flush alinement with the bottom of said counterbore but spaced radially from the wall of the opening, a relatively short and wide ring of elastic material which radially overlaps the adjacent marginal portions of said main member and of said flange, clamping rings bearing flatwise against the inner and outer portions respectively of said elastic ring and means for securing said clamping ring to said main member and said flange respectively to clamp said elastic ring flatwise against them.

WILLIAM P. COX.